(12) United States Patent
Lax et al.

(10) Patent No.: US 8,707,442 B1
(45) Date of Patent: Apr. 22, 2014

(54) DYNAMIC UNIVERSAL RESOURCE LOCATOR (URL) CONSTRUCTION FOR ACCESSING MEDIA CONTENT

(75) Inventors: Reuven Lax, Seattle, WA (US); Chao Cai, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1541 days.

(21) Appl. No.: 12/016,868

(22) Filed: Jan. 18, 2008

(51) Int. Cl.
G06F 7/04 (2006.01)
G06F 17/30 (2006.01)
H04N 7/16 (2011.01)

(52) U.S. Cl.
USPC .......................................................... 726/26

(58) Field of Classification Search
None
See application file for complete search history.

(56) References Cited

U.S. PATENT DOCUMENTS

| | | | |
|---|---|---|---|
| 6,360,254 B1 * | 3/2002 | Linden et al. ................. 709/219 |
| 7,133,895 B1 * | 11/2006 | Lee et al. ..................... 709/204 |
| 2003/0014503 A1 * | 1/2003 | Legout et al. ................ 709/219 |
| 2004/0181490 A1 * | 9/2004 | Gordon et al. ................ 705/59 |

* cited by examiner

Primary Examiner — Nadia Khoshnoodi
(74) Attorney, Agent, or Firm — Fenwick & West LLP

(57) ABSTRACT

A dynamic URLs construction system includes a publisher server and one content accessor server. The publisher server has a content URL access module, a content access module and a content database for storing media content and providing content URL accessing instructions and media content to a content accessor server. Media content provided by a publisher is accessed using dynamic URLs. A content accessor server includes at least one dynamic URL generation module and one content retrieval module. The content accessor server receives a content ID and a template URL containing instruction for constructing the corresponding dynamic URL from the publisher server. The dynamic URL generation module parses the template URL instructions, obtains an access key associated with the dynamic URL and constructs the dynamic URL using the access key and the content ID. The content retrieval module retrieves the content referenced by the dynamic URL.

15 Claims, 5 Drawing Sheets

DYNAMIC UNIVERSAL RESOURCE LOCATOR (URL) CONSTRUCTION FOR ACCESSING MEDIA CONTENT

BACKGROUND

1. Field of the Invention

This invention pertains in general to accessing data over a computer network, and in particular to constructing dynamic universal resource locators (URLs) to access media content.

2. Description of the Related Art

The World Wide Web of interlinked data residing on computer servers located throughout the Internet has become a very popular mechanism for distributing information among a wide audience. Many content publishers now provide streaming media and other types of multimedia content. A piece of content is accessed through a URL that specifies the location and name of the content.

Sometimes, a publisher desires to restrict access to the content it provides. For example, a publisher that provides advertisements might seek to insure that the advertisements are only downloaded by clients that contemporaneously download the web page on which the advertisements appear. One technique for restricting access to content is the use of dynamic URLs. A dynamic URL is a URL for specific content that is valid for only a short period of time. Thus, the dynamic URL can be used to download advertisements and/or other content at the time the web page on which the content appears is downloaded, but the dynamic URL cannot be used to later access the content.

However, using dynamic URLs in this manner presents difficulties for third parties that have legitimate needs to access the content. For example, a third party that serves advertisements incorporating the content from the publisher might need to access the content to determine policy compliance, generate thumbnail views of the content, index the content for web searching, and/or for other purposes. The third party needs to access the content on its own schedule, and thus cannot use dynamic URLs because the URLs are likely to have expired by the time the third party seeks the content. Therefore, there is a need for a way to allow legitimate third parties to access content from a publisher at any given time, while still maintaining the security afforded by dynamic URLs.

BRIEF SUMMARY OF THE INVENTION

The above and other needs are met by a method, system, and computer program product that receives a template URL from a publisher and generates a dynamic URL based on the template URL for accessing content provided by the publisher. Embodiments of the dynamic URL construction method include receiving a template URL from a publisher, obtaining an access key associated with the dynamic URL to be generated based on the instructions specified in the template URL and generating the dynamic URL using the access key. Embodiments of the dynamic URL construction system include a publisher server, a content accessor server and at least a dynamic URL construction module and a content retrieval module executed by the content accessor server. The publisher server provides media content and associated content accessing information to the content accessor server. The dynamic URL construction module receives a template URL with accessing information specified in the template URL from the publisher server, accesses an access key associated with the dynamic URL to be generated and generates the dynamic URL. The content retrieval module uses the dynamic URL to access the content. Embodiments of the dynamic URL construction computer program product include a dynamic URL construction module for receiving a template URL from the publisher, obtaining an access key associated with the dynamic URL to be generated based on the instructions specified in the template URL and generating the dynamic URL using the access key. Embodiments of the dynamic URL construction computer program product also include a content retrieval module for accessing content referenced by the dynamic URL.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
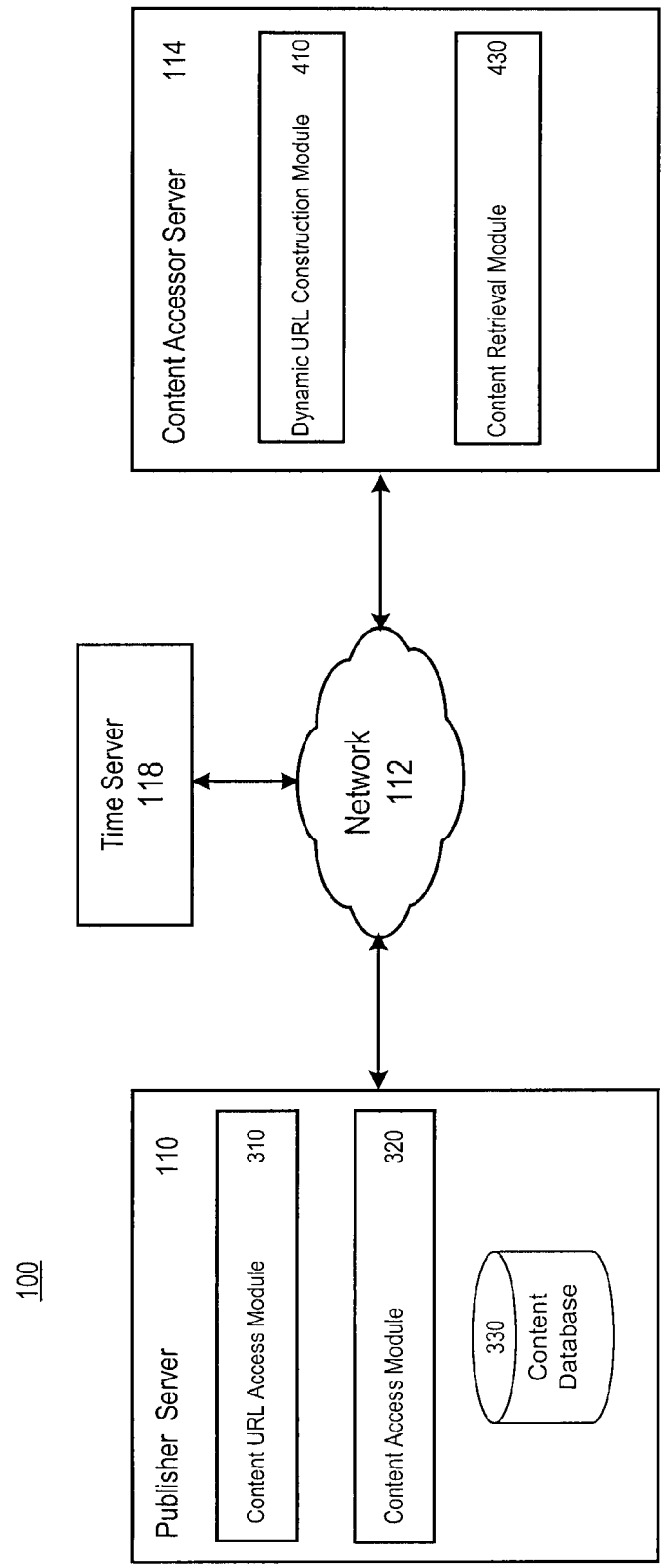
FIG. 1 is a high-level block diagram illustrating an environment having a dynamic URL construction system according to one embodiment.

FIG. 1 is a high-level diagram illustrating an environment having a dynamic URL construction system 100 that constructs dynamic URLs to access media content according to one embodiment. The environment comprises a publisher server 110 connected to a content accessor server 114 and a time server 118 via a computer network 112.

The publisher server 110 communicates with the content accessor server 114 and/or the time server 118 through the computer network 112. Publisher server 110 provides media content and content accessing information to the content accessor server 114. In one embodiment, the content accessing information includes content identifications (IDs) identifying content, template URLs for constructing corresponding dynamic URLs for accessing the content, and access keys for inclusion in the dynamic URLs. Only one publisher server 110 is included in FIG. 1 in order to simplify the figure. There can be hundreds or thousands of publisher servers 110 using the dynamic URL construction system 100 in some embodiments.

In one embodiment, the publisher server 110 contains a content URL access module 310, a content access module 320 and a content database 330. Other embodiments can have different and/or additional modules than the ones shown in the figure. In addition, the functions can be distributed among the modules in a different manner than is described here.

The content URL access module 310 supplies accessing information associated with content provided by the publisher server 110. The content access module 320, in turn, verifies dynamic URLs received from the content accessor server 114, and provides the content referenced by the dynamic URLs. The content database 330 stores the media content provided by the publisher server 110. The stored content can include streaming video, still images, 3D scenes and other types of media content. Each piece of media content stored in the content database 330 is identified by a content ID.

The network 112 enables communications between the publisher server 110, the content accessor server 114 and/or the time server 118. In one embodiment, the network 112 uses standard communications technologies and/or protocols. Thus, the network 112 can include links using technologies such as Ethernet, 802.11, integrated services digital network (ISDN), digital subscriber line (DSL), asynchronous transfer mode (ATM), etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above.

The content accessor server 114 communicates with the publisher server 110 and/or the time server 118 through the computer network 112. The content accessor server 114 receives content and content accessing information from the publisher server 110. In one embodiment, the content accessor server 114 obtains an access key for the content, constructs the corresponding dynamic URL based on the content accessing information, and retrieves the content referenced by the dynamic URL. Only one content accessor server 114 is included in FIG. 1 in order to simplify the figure. There can be multiple content accessor servers 114 using the dynamic URL construction system 100 in some embodiments.

As shown in FIG. 1, in one embodiment, the content accessor server 114 contains a dynamic URL construction module 410 and a content retrieval module 430. The dynamic URL construction module 410 generates access keys for content using content IDs and content accessing information received from the publisher server 110, and constructs dynamic URLs for the content. The content retrieval module 430 retrieves the content referenced by the dynamic URLs. Other embodiments can have different and/or additional modules than the ones shown in the figure. In addition, the functions can be distributed among the modules in a different manner than is described here.

The time server 118 provides the current time to the publisher server 110, the content accessor server 114, and/or other entities on the network 112. In one embodiment, the publisher server 110 and the content accessor server 114 use the time server 118 to synchronize their operations. Otherwise, small differences in times provided by the internal clocks of the publisher server 110 and the content accessor server 114 might result in errors such as invalid dynamic URLs. In one embodiment, the time server 118 is an Internet time server using a standard protocol for distributing and synchronizing time, e.g., the Network Time Protocol (NTP). In other embodiments, the time server 118 uses other time protocols.

Figure 2:
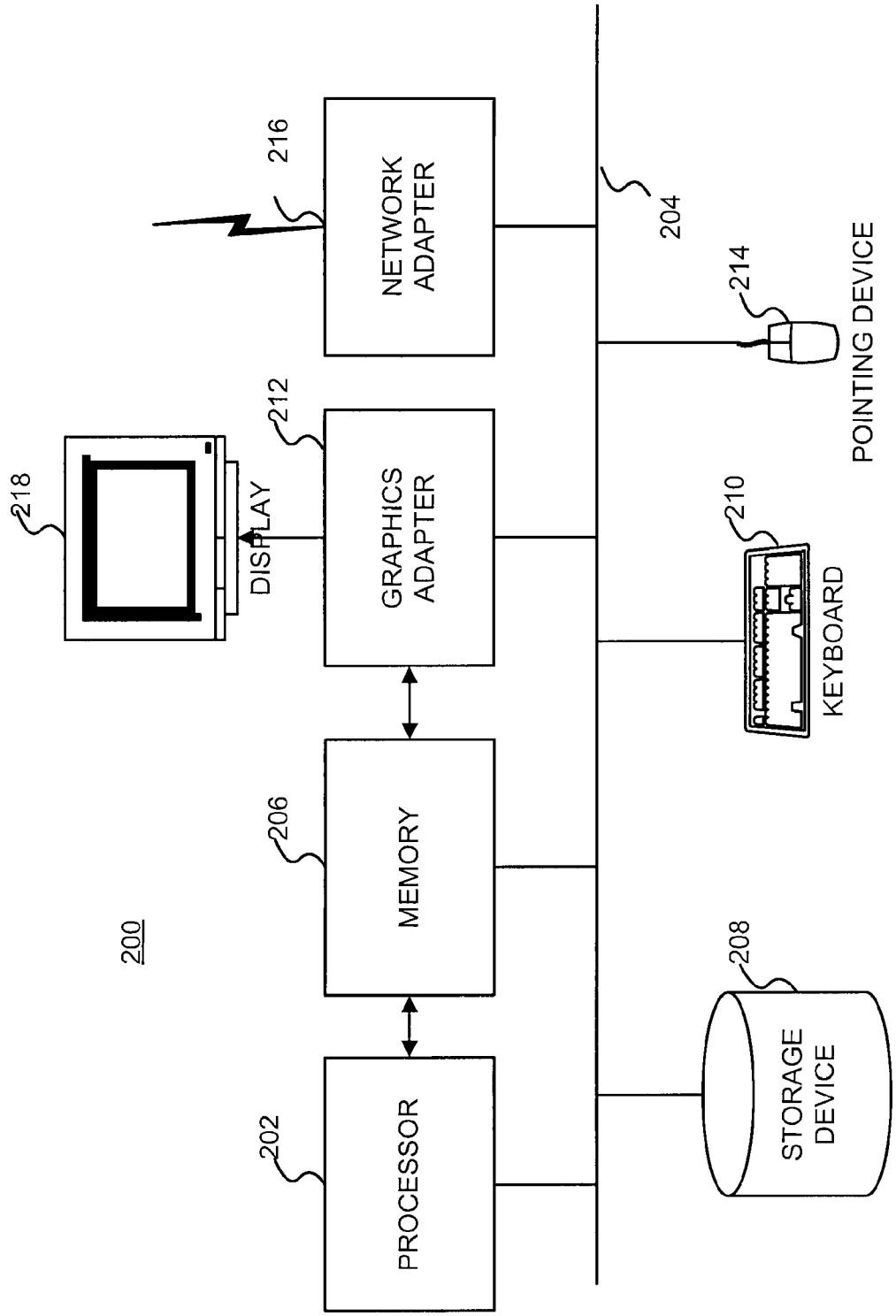
FIG. 2 is a high-level block diagram of a computer for acting as a publisher server, a content accessor server and/or a time server according to one embodiment

FIG. 2 is a high-level block diagram of a computer 200 for acting as a publisher server 110, a content accessor server 114, a time server 118, and/or a manager of the content database 330 of the publisher server 110 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The storage device 208 is any device capable of holding data, like a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. For example, a computer 200 acting as a content accessor server 114 can lack a keyboard 210, pointing device 214, graphics adapter 212, and/or display 218. Moreover, the storage device 208 can be local and/or remote from the computer 200 (such as embodied within a storage area network (SAN)).

Also as is known in the art, the computer system 200 is adapted to execute computer program modules for providing functionality described herein. In this description, the term "module" refers to computer program logic for providing the specified functionality. A module can be implemented in hardware, firmware, and/or software. In one embodiment, the modules are stored on the storage device 208, loaded into the memory 206, and executed by the processor 202.

Figure 3:
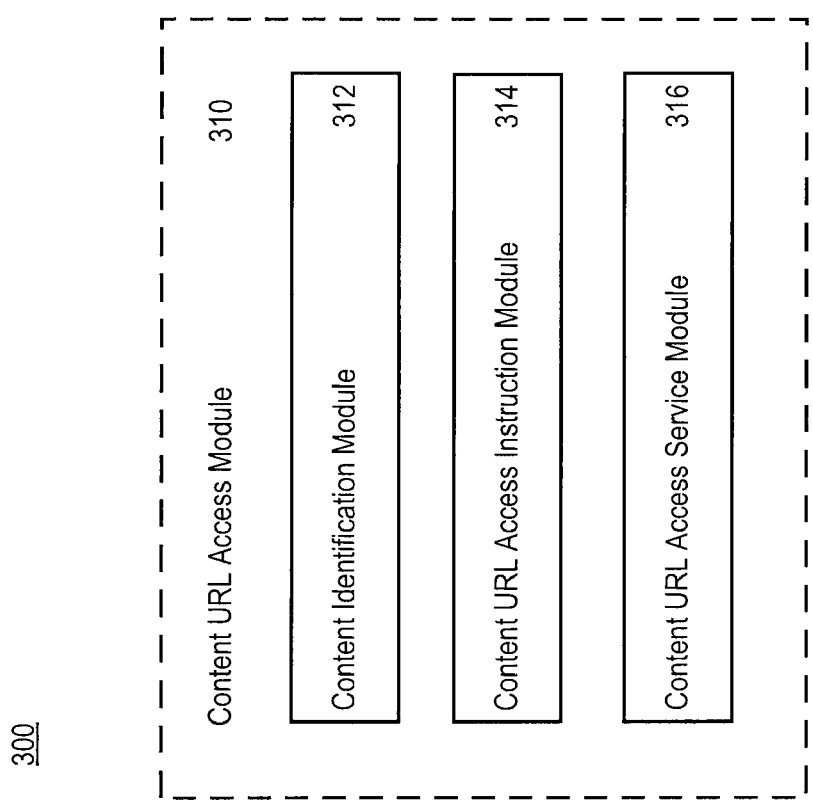
FIG. 3 is a high-level block diagram illustrating modules within the content URL access module of a publisher server according to one embodiment.

FIG. 3 is a high-level block diagram illustrating a more detailed view of the content URL access module 310 according to one embodiment. The content URL access module 310, in the embodiment illustrated in FIG. 3, includes a content identification module 312, a content URL access instruction module 314 and a content URL access service module 316. Those of skill in the art will recognize that other embodiments can have different and/or additional modules than those shown in FIG. 3 and the other figures. Likewise, the functionalities can be distributed among the modules in a manner different than described herein.

Turning now to the individual entities of the content URL access module 310, the content identification module 312 identifies each piece or group of content stored in the content database 330. Each piece of content is identified by a content ID and group of content is identified by a group ID. In one embodiment, the content URL access module 310 uses a single content ID to identify a single piece of the content, such as a short video clip, to be accessed. In other embodiments, the content URL access module 310 uses a group ID to identify a group of content to be accessed.

The content URL access instruction module 314 provides the content accessor server 114 with information allowing the content accessor server 114 to generate dynamic URLs for accessing content. In one embodiment, the information includes a content/group ID, an encoding key and method, and a template URL that contains instructions specifying how to generate the access key using the encoding key and method. The content URL access instruction module 314 may provide the encoding key and method to the content accessor sever 114 in a separate, secure communication.

In one embodiment, a template URL includes a plurality of parameters to be encoded and instructions for generating the access key using the encoding key and method. For example, the content URL access instruction module 314 provides the following template URL to the content accessor server 114: http://www.publisher.com/encode?params=(accessor=%accessor_id%&timestamp=%gmt%&media_id=%media_id%).

The "encode" element of the template URL signals the content accessor server 114 to encode the following template URL parameters with their respective parameter values to generate the access key: "accessor", "timestamp" and "media_id". The "media_id" parameter identifies the media content requested by the content accessor server 114. The "accessor_id" parameter identifies the content accessor server 114 that requests the access to the media content. The "timestamp" parameter is the time that the dynamic URL is generated by the content accessor server 114.

Alternatively, the content URL access instruction module 314 may include instructions in the template URL to identify the time server 118, to be used by both the publisher server 110 and the content accessor server 114. For example, the content URL access instruction module 314 may provide the following template URL to the content accessor server 114: http://www.publisher.com/encode?params=(accessor=%accessor_id%&timestamp=<ntp:this_time_server>&media_id=%media_id%), instructing the content accessor server 114 to use a NTP time server, "this time server", for the timestamp information.

The content URL access service module 316 provides a service that the content accessor server 114 can access in order to obtain the access key for the content directly from the publisher. In one embodiment, the access service module 316 provides the service at a web site accessible to the content accessor server 114 over a secure connection. The content accessor server 114 accesses the service and provides with the required template URL parameter-value pairs, and gets the access key for the content in return.

For example, the content URL access service module 316 may provide the following template URL to the content accessor server 114: http://www.publisher.com/?<https://www.publisher.com/encode>(accessor=%accessor_id%&timestamp=%gmt%&media_id=%media_id%).

The template URL contains a pair of angled brackets "<" and ">", which are invalid characters in conventional URL encoding schemes. The brackets indicate to the content accessor server 114 that the access key is provided to the content accessor server 114 as an access service located at a web site. The URL inside the angled brackets, i.e., https://www.publisher.com/encode, is the web site that provides the access service. The (accessor=%accessor_id%&timestamp=% gmt%&media_id=%media_id%) portion of the template URL indicates the URL parameters to be provided by the content accessor server 114. The content accessor server 114 accesses the web site over a secure connection with the required parameter-values pairs as follows: https://www.publisher.com/encode?(accessor=%accessor_id%&timestamp=%gmt%&media_id=%media_id%), and obtains the access key generated by the publisher server 110 in return.

Figure 4:
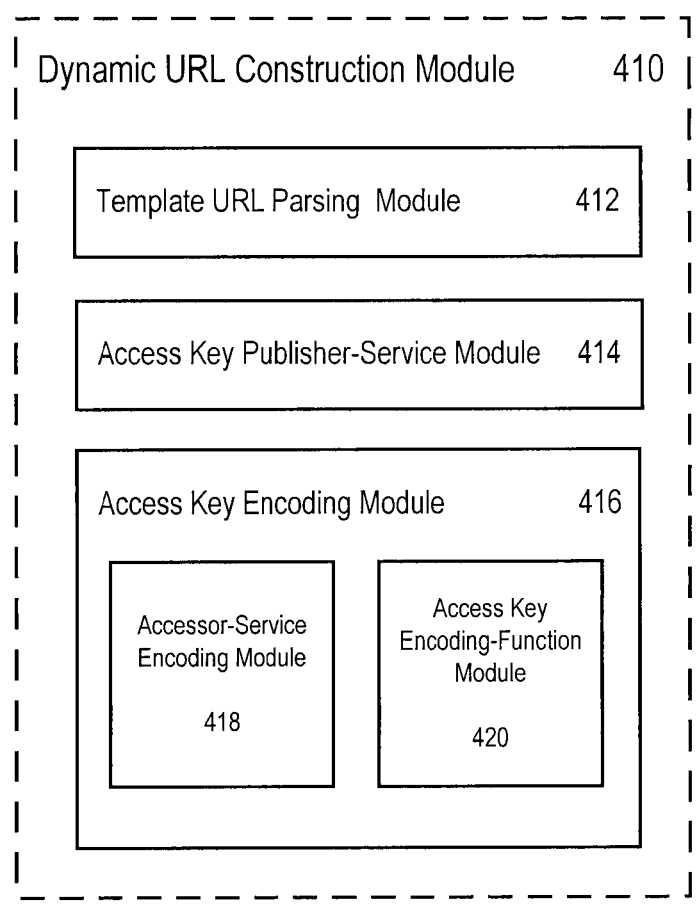
FIG. 4 is a high-level block diagram illustrating modules within the dynamic URL construction module of a content accessor server according to one embodiment.

To access the media content provided by the publisher server 110, the content accessor server 114 needs to obtain an access key either by generating the key itself or using an access service. With the access key, the content accessor server 114 constructs the dynamic URL and accesses the content. The content accessor server 114 uses a dynamic URL generation module 410 to obtain the access key and construct the dynamic URL. FIG. 4 is a high-level block diagram illustrating a more detailed view of the dynamic URL generation module 410 according to one embodiment. The dynamic URL generation module 410, in the embodiment illustrated in FIG. 4, contains a template URL parsing module 412, an access key publisher-service module 414 and an access key encoding module 416.

The template URL parsing module 412 parses instructions embedded in template URLs received from the publisher server 110. In one embodiment, the template URL parsing module 412 parses the embedded instructions using a standard percent decoding method. In other embodiments, the template URL parsing module 412 uses other URL decoding methods known to those of skill in the art. As a result, the parsing module 412 learns the set of URL parameters and the order of the parameters in a request for content. The parsing module 412 also learns whether the access key is generated by the content accessor server 114, or whether the key is obtained using an access service.

For example, assume the content accessor server 114 receives the following template URL from the publisher server 110: http://www.publisher.com/encode?params=(accessor=%accessor_id%&timestamp=%gmt%&media_id=%media_id%).

The template URL parsing module 412 parses the template URL and identifies the URL encoding method used in the URL. In this case, the template URL uses standard percent encoding method on the URL parameters. The template URL parsing module 412 parses the URL and identifies any URL embedded within the angled brackets. Since the URL within the angled brackets is absent, the template URL parsing module 412 recognizes that the "encode" character string indicates that the access key for the content is to be generated by the content accessor server 114 using the encoding key and method provided by the publisher server 110. The template URL parsing module 412 also identifies the list of URL parameters to be encoded by the content accessor server 114. In response to the identification of the list of URL parameters, the parsing module 412 separates each individual parameter from the list, i.e., "accessor", "timestamp" and "media_id". In addition, the parsing module 412 also records the order of the parameters. After parsing the template URL, the parsing module 412 passes the list of the parsed parameters and the order of the parameters to the access key encoding module 416 for further processing.

In another example, the content accessor server 114 receives the following template URL from the publisher server 110: http://www.publisher.com/?<https://www.publisher.com/encode>(accessor=%accessor_id %&timestamp=%gmt%&media_id=%media_id%).

The template URL parsing module 412 parses the template URL and identifies the URL within the angled brackets. In this case, the URL within the brackets identifies the publisher server 110, i.e., "https://www.publisher.com" that provides the access service. As such, the parsing module 412 uses an access service provided by the publisher server 110 to obtain the access key. The template URL parsing module 412 also identifies the types and order of the parameters to supply. The parsing module 412 passes the list of the parsed parameters, the order of the parameters and the access service information, such as the web site providing the access service, to the access key publisher-service module 414 for further processing.

In response to receiving a list of URL parameters, the order of the parameters and the access service information, the publisher-service module 414 populates the URL parameters with the needed values and accesses the service located at the address specified by the URL. In return, the access key publisher-service module 414 obtains the access key. The publisher-service module 414 constructs the dynamic URL using the access key.

Using the same example as above, the access key publisher-service module 414 receives a list of parameters, e.g., "accessor", "timestamp" and "media_id", and the order of the parameters. The publisher-service module 414 also receives the web site at which the access service is located, and what service is provided. In this case, the web site is the following URL, https://www.publisher.com, and the service is to encode required parameter-value pairs. The access key publisher-service module 414 fills the following parameters with needed values, "accessor=accessor_id", "timestamp=gmt" and "media_id=media_id", and accesses the service located at the following URL:
https://www.publisher.com/encode?(accessor=%accessor_id%& timestamp=%gmt%&media_id=%media_id%).

In return, the publisher-service module 414 gets an access key from the publisher server 110, for example, "access_key1=key_value1", where the "key_value" is generated by the publisher server 110 by encoding the parameter-value pairs provided by the publisher-service module 414. The access key publisher-service module 414 uses the content ID, i.e., media_id, and the access key to construct the following dynamic URL for content:
http://www.publisher.com/media_id=%media_id%&%access_key1=key_value1%.

Turning now to the access key encoding module 416 of the dynamic URL construction module 410, the access key encoding module 416 receives a list of URL parameters, the order of the parameters and an instruction to use the encoding key and method information to generate the access key. The access key encoding module 416 fill the value for each parameter, locates the encoding key and method received from the publisher server 110, encodes the parameter-value pairs using the encoding key and method to generate the access key, and constructs the dynamic URL using the access key. In one embodiment illustrated in FIG. 4, the access key encoding module 416 includes an accessor-service encoding module 418 and an access key encoding-function module 420.

In one embodiment, the encoding method is an encryption algorithm and the encoding key is the encryption key. The accessor-service encoding module 418 provides an accessing service for the access key encoding module 416 to obtain the access key. This accessor-provided access service mimics the publisher-provided service, i.e., encoding the parameter-value pairs using the encoding key and method and returning the access key to the access key encoding module 416.

Using the same example as above, the accessor-service encoding module 418 performs the same functionality as the content URL access service module 316 of the publisher server 110. In one embodiment, the encoding-function module 420 implements the received encoding method with its associated key. The access key encoding-function module 420 returns the access key to the access key encoding module 416 to construct the dynamic URL.

Figure 5:
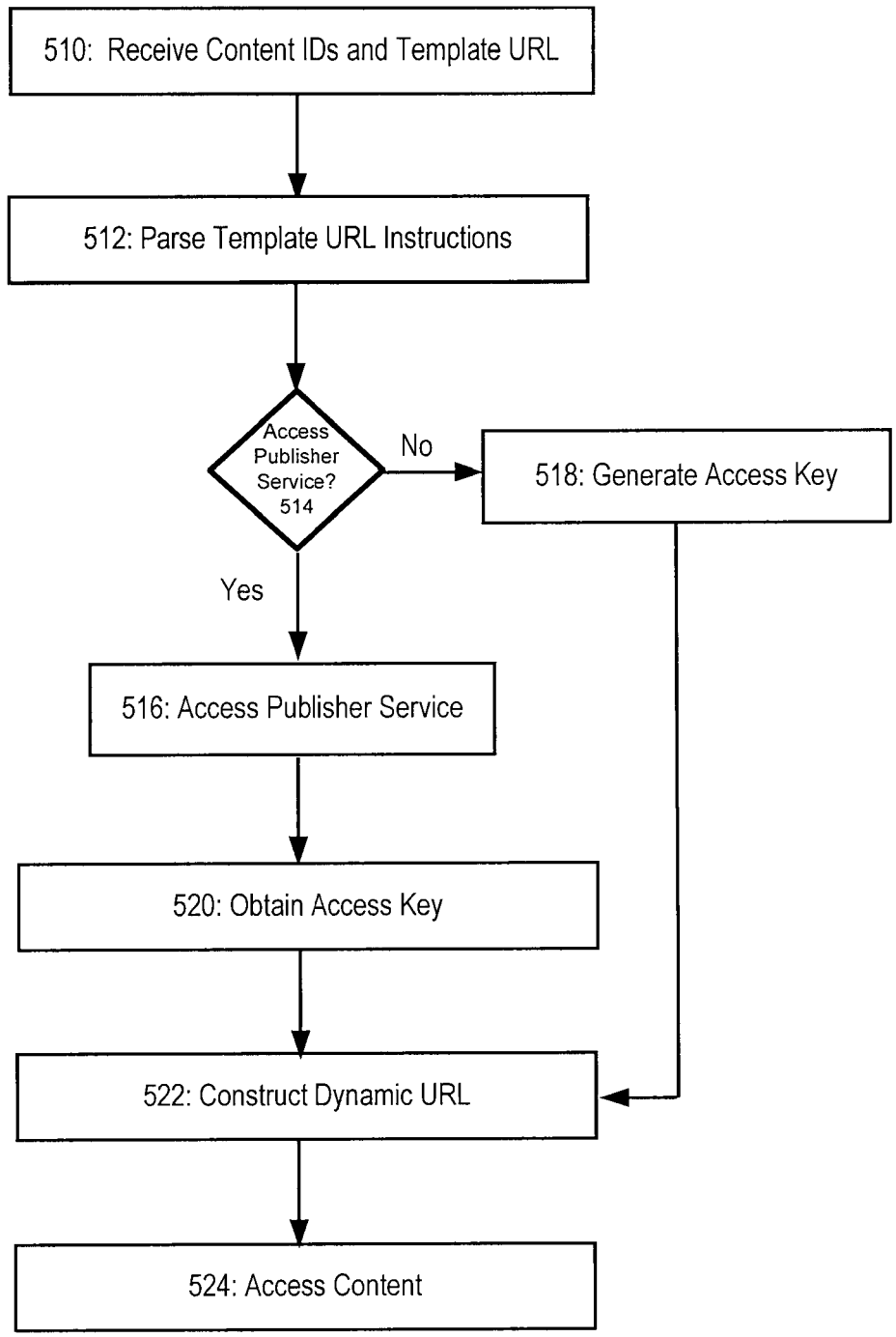
FIG. 5 is a flowchart showing a method of constructing dynamic URLs to access media content according to one embodiment.

FIG. 5 is a flowchart showing a method of constructing dynamic URLs to access media content according to one embodiment. Initially, the content accessor server 114 receives 510 content/group ID(s) and a template URL, where the template URL contains instructions on how to generate the access keys of content identified by the content/group ID(s). The template URL parsing module 412 of the dynamic URL generation module 410 parses 512 the template URL instructions, which indicate 514 whether to access a publisher-provided service to obtain the access key, or to generate the access key using a supplied encoding key and method. If the publisher-provided service needs to be accessed, the access key publisher-service module 414 accesses 516 the publisher-provided service, obtains 520 the access key, and constructs 522 the dynamic URL using the access key. The content retrieval module 430 accesses 524 the content referenced by the dynamic URL.

If the content accessor server 114 needs to generate the access key, the access key encoding module 416 generates 518 the access key either by accessing the accessor-provided service via the accessor-service encoding module 418, or by invoking an encoding function call via the access key encoding-function module 420. The access key encoding module 416 constructs 522 the dynamic URL using the access key. The content retrieval module 430 accesses 524 the content at the dynamic URL.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method for generating a dynamic universal resource locator (URL) for accessing content provided by a publisher, the method comprising:
   using a computer to perform steps comprising:
      receiving a template URL from the publisher, the template URL including instructions for generating the dynamic URL for accessing the content and instructions for obtaining an access key associated with the dynamic URL;
      obtaining the access key associated with the dynamic URL by:
         analyzing the template URL to identify an address of an access key service and parameters for the service, the access key service located at a remote website different from a website identified by the dynamic URL for accessing the content;
         accessing the access key service at the identified address and providing the identified parameters to the access key service;
         receiving the access key from the access key service in response to providing the identified parameters; and
      generating the dynamic URL using the access key received from the access key service.

2. The method of claim 1, further comprising:
   accessing the content using the dynamic URL.

3. The method of claim 1, wherein generating the dynamic URL comprises:
   generating the dynamic URL based at least in part on the instructions specified in the template URL.

4. The method of claim 1, wherein obtaining the access key further comprises:
   identifying types and an order of the parameters for the access key service; and
   providing the identified types of parameters in the identified order to the access key service.

5. The method of claim 1, further comprising:
   analyzing the template URL to determine whether the access key is generated by an encoding method performed by a content accessor or whether the access key is obtained using the access key service.

6. A computer system for generating a dynamic universal resource locator (URL) for accessing content provided by a publisher, the computer system comprising:
- a non-transitory computer-readable storage medium storing executable computer program modules comprising:
  - a receiving module configured to receive a template URL from the publisher, the template URL including instructions for generating the dynamic URL for accessing the content and instructions for obtaining an access key associated with the dynamic URL;
  - an access key module configured to obtain the access key associated with the dynamic URL by:
    - analyzing the template URL to identify an address of an access key service and parameters for the service, the access key service located at a remote website different from a website identified by the dynamic URL for accessing the content;
    - accessing the access key service at the identified address and providing the identified parameters to the access key service; and
    - receiving the access key from the access key service in response to providing the identified parameters;
  - a construction module configured to generate the dynamic URL using the access key received from the access key service; and
- a processor for executing the computer program modules.

7. The system of claim 6, further comprising:
a content retrieval module configured to access the content using the dynamic URL.

8. The system of claim 6, wherein the construction module is further configured to generate the dynamic URL based at least in part on the instructions specified in the template URL.

9. The system of claim 6, wherein the access key module is further configured to:
- identifying types and an order of the parameters for the access key service; and
- providing the identified types of parameters in the identified order to the access key service.

10. The system of claim 6, further comprising:
a parsing module configured to analyze the template URL to determine whether the access key is generated by an encoding method performed by a content accessor or whether the access key is obtained using the access key service.

11. A non-transitory computer-readable storage medium storing executable computer program instructions for generating a dynamic universal resource locator (URL) for accessing content provided by a publisher, the computer program instructions comprising instructions for:
- receiving a template URL from the publisher, the template URL including instructions for generating the dynamic URL for accessing the content and instructions for obtaining an access key associated with the dynamic URL;
- obtaining the access key associated with the dynamic URL by: analyzing the template URL to identify an address of an access key service and parameters for the service, the access key service located at a remote website different from a website identified by the dynamic URL for accessing the content;
  - accessing the access key service at the identified address and providing the identified parameters to the access key service; and
  - receiving the access key from the access key service in response to providing the identified parameters; and
- generating the dynamic URL using the access key received from the access key service.

12. The computer-readable storage medium of claim 11, further comprising instructions for:
accessing the content using the dynamic URL.

13. The computer-readable storage medium of claim 11, wherein the instructions for generating the dynamic URL comprises instructions for:
generating the dynamic URL based at least in part on the instructions specified in the template URL.

14. The computer-readable storage medium of claim 11, wherein the program instructions for obtaining the access key comprises instructions for:
- identifying types and an order of the parameters for the access key service; and
- providing the identified types of parameters in the identified order to the access key service.

15. The computer-readable storage medium of claim 11, further comprising computer program instructions for:
analyzing the template URL to determine whether the access key is generated by an encoding method performed by a content accessor or whether the access key is obtained using the access key service.

* * * * *